(12) United States Patent
Reumann et al.

(10) Patent No.: US 8,085,915 B2
(45) Date of Patent: Dec. 27, 2011

(54) SYSTEM AND METHOD FOR SPAM DETECTION

(75) Inventors: John Reumann, Croton-on-Hudson, NY (US); Debanjan Saha, Mohegan Lake, NY (US); Zon-Yin Shae, South Salem, NY (US); Kunwadee Sripanidkulchai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/131,334

(22) Filed: Jun. 2, 2008

(65) Prior Publication Data

US 2008/0226047 A1 Sep. 18, 2008

Related U.S. Application Data

(63) Continuation of application No. 11/334,920, filed on Jan. 19, 2006, now abandoned.

(51) Int. Cl.
*H04M 1/56* (2006.01)
*H04M 15/06* (2006.01)
*H04M 1/64* (2006.01)

(52) U.S. Cl. ............... 379/142.05; 379/88.02; 370/352

(58) Field of Classification Search ............ 379/142.01, 379/142.05, 142.06, 207.13, 210.02, 210.03, 379/211.01, 188, 196, 88.01, 88.02, 93.02, 379/93.03; 370/352
See application file for complete search history.

(56) References Cited

U.S. PATENT DOCUMENTS

| 6,542,583 | B1 | 4/2003 | Taylor | |
|---|---|---|---|---|
| 7,463,724 | B2 | 12/2008 | Ruckart | |
| 2002/0120853 | A1* | 8/2002 | Tyree | 713/188 |
| 2004/0199597 | A1* | 10/2004 | Libbey et al. | 709/207 |
| 2004/0254793 | A1* | 12/2004 | Herley et al. | 704/270 |
| 2007/0121596 | A1* | 5/2007 | Kurapati et al. | 370/356 |

FOREIGN PATENT DOCUMENTS

| CN | 1390014 | 1/2003 |
|---|---|---|
| CN | 1648924 | 8/2005 |

* cited by examiner

*Primary Examiner* — Quoc D Tran
(74) *Attorney, Agent, or Firm* — Tutunjian & Bitetto, P.C.; Brian P. Verminski (57) ABSTRACT

A voice-over-internet protocol (VoIP) caller verification method includes generating a challenge to be sent to a VoIP caller which needs a response from the VoIP caller prior to accepting a VoIP call, wherein the challenge includes a test pattern crafted to create a greater load at a spammer VoIP caller as compared to a human VoIP caller. A response or lack thereof is determined from the VoIP caller, and the response is analyzed relative to an acceptable response to determine whether the VoIP caller is acceptable to communicate with.

21 Claims, 6 Drawing Sheets

SYSTEM AND METHOD FOR SPAM DETECTION

RELATED APPLICATION INFORMATION

This application is a Continuation application of U.S. patent application Ser. No. 11/334,920 filed Jan. 19, 2006 now abandoned, incorporated herein by reference in its entirety.

BACKGROUND

1. Technical Field

The present invention relates to caller detection and more particularly to a system and method for determining spam and unsolicited calls.

2. Description of the Related Art

Anonymity of Internet Protocol (IP) users is a key problem in providing services over the Internet. This affects all services including Voice-over-IP (VoIP) based services. While telephone fraud has always been a problem, the Internet has made this problem more serious because automation of fraud has become much easier. Therefore, it is important for both service providers and users to stop automated attacks that are delivered over IP.

Session Initiation Protocol or SIP, is a signaling protocol for Internet conferencing, telephony, events notification and instant messaging. In SIP and VoIP networks, unsolicited messages and calls can be automatically generated and delivered to phones in a cheaper and faster manner than in telephone networks.

Consider two types of spam: (1) Call Spam. Call Spam is where the caller wishes to successfully initiate a dialog and have a media session. For example, unsolicited calls that are automatically initiated and carried out by software using 'pre-recorded' streams similar to telemarketing calls today. (2) Call initiation spam. Call initiation span is where the caller does not wish to successfully initiate a dialog and have a media session. For example, unsolicited INVITE spam with spoofed SIP URIs or IP addresses.

While telephone network span (telemarketing) may be solved using legislation, IP networks cross international borders and spammers may not be in a jurisdiction in which certain laws apply. Email spam issues may be solved using spam filters that passively analyze headers and content contained in individual email messages. This is not guaranteed to be effective because headers can be forged or spoofed. Further, content analysis is not guaranteed to be effective for VoIP span because content cannot be analyzed until a call is already established and the content has already being transmitted.

Third party infrastructure services such as reputation systems and consent-based communications can be used to verify callers. However, third party infrastructure services require both caller and callee to participate in such systems.

SUMMARY

One or more embodiments of the invention addresses several problems. These problems may be illustrated as, for example, when a service provider wants to ensure that a human being is accessing the provided service and not some automated attack script, or when a user of the telephone service wants to prevent automated phone spam. There are no known commercial solutions to these problems since the technology is still relatively new and the attacks over IP have not been completely automated.

A voice-over-internet protocol (VoIP) caller verification method comprises generating a challenge to be sent to a VoIP caller which needs a response from the VoIP caller prior to accepting a VoIP call, wherein the challenge includes a test pattern crafted to create a greater load at a spammer VoIP caller as compared to a human VoIP caller. A response or lack thereof is determined from the VoIP caller, and the response is analyzed relative to an acceptable response to determine whether the VoIP caller is acceptable to communicate with.

A non-software system for VoIP caller verification includes a challenge generator which generates challenges to be sent to a VoIP caller responsive to an initiation by the VoIP caller for communications, the challenge requiring a response, wherein the challenge includes a test pattern crafted to create a greater load at a spammer VoIP caller as compared to a human VoIP caller. A determination module determines if a response has been received and receives the response from the caller. An analyzing device determines if the response is acceptable as compared to an acceptable response to determine whether the VoIP caller is acceptable to communicate with.

A computer program product comprises a non-transitory computer useable medium including a computer readable program, wherein the computer readable program when executed on a computer causes the computer to perform the method steps of generating a challenge to be sent to a VoIP caller which requires a response from the VoIP caller prior to accepting a VoIP call or permitting the VoIP call to ring at the callee. The challenge includes a test pattern crafted to create a greater load at a spammer VoIP caller as compared to a human VoIP caller. A response or lack thereof is determined from the VoIP caller, and the response is analyzed relative to an acceptable response to determine whether the VoIP caller is acceptable to communicate with. If the VoIP caller is acceptable, the VoIP call is accepted or a ring at the callee is permitted.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention may include an automatic echo test or a human caller test, which screens calls and other communications to determine whether the communication is an unsolicited and undesirable communication, e.g., a sales call, spam, etc.

In a SIP transaction, messages (either requests or responses) are sent between devices that use either User Datagram Protocol (UDP) or Transmission Control Protocol (TCP) or other transport protocols. UDP is a communications protocol that offers a limited amount of service when messages are exchanged between computers in a network that uses the Internet Protocol (IP). UDP is an alternative to the TCP and, together with IP, is sometimes referred to as UDP/IP. These requests or responses may be made of up two parts: a set of headers and one or more message bodies.

When a SIP request (or INVITE) is sent, it is sent to the intended party's (or User Agent's (UA)) SIP address. SIP addresses are actually URLs and are like e-mail addresses. Before a message is delivered to the receiving user agent (UA), it is first sent to a proxy server, which routes and delivers the message to the receiving UA. The response from the receiving UA is then sent back to the initiating UA via proxy servers.

While SIP does not actually define what a session is, it does provide a description of the session in which the user is being invited. In one illustrative embodiment, upon receiving an INVITE, the caller UA engages in an automated test and labels the call as legitimate or suspected span based on the outcome of the test. Based on the label, different actions (drop, filter, ring, forward to voicemail) may be taken to handle the call. The test may be performed on behalf of the callee by its UA, proxy server, a hardware agent, or a software agent.

The embodiments of the present invention provide effective detection of unwanted calls even when a spammer uses spoofed IP addresses and SIP URIs. Effective detection is also provided before permitting a call to be established and content to be delivered. The embodiments only need to be implemented by the callee and are entirely interoperable with SIP protocol.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
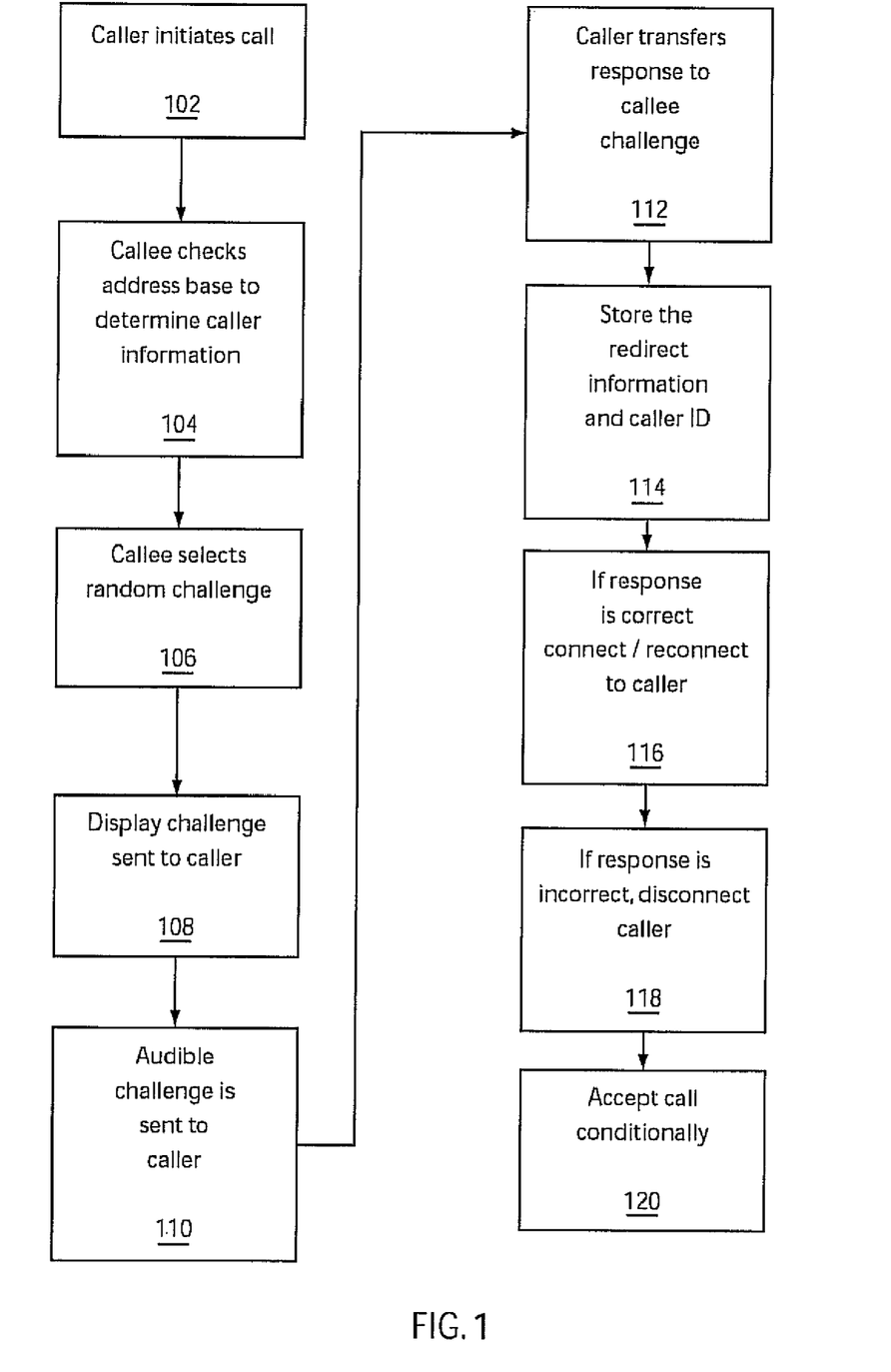
FIG. 1 is a block/flow diagram for verification of an acceptable user and/or detecting spam in a human test in accordance with one embodiment of the present invention.

Referring now to the drawings in which like numerals represent the same or similar elements and initially to FIG. 1, a block/flow diagram illustratively shows a system/method for detecting spam/unwanted calls for network telephone systems. The system/method uses a redirection function of the SIP protocol to respond to a SIP call-in (INVITE).

There are many existing mechanisms that establish that a human is reading a document, e.g., characters with pixel noise that make optical character recognition (OCR) nearly impossible. Similar techniques can be applied to audio renderings of challenge messages, e.g., by mixing noise into an audio signal, noise with frequency elements that cover the human voice spectrum would be especially effective in derailing voice recognition software.

Advantageously, embodiments of the present invention provide an integration of a challenge response atop the SIP protocol without requiring changes to the widely deployed protocol. The technique achieves automated caller detection circuits for SIP or VoIP. The following will describe a SIP exchange for a telephone call, although the present invention is not limited to telephone applications.

A typical telephone exchange includes, a caller sends a SIP INVITE to a callee over a network, such as the Internet or any other network or communications link. The callee receives a CONNECTION IN PROGRESS (e.g., from a proxy or agent), or the callee's handset rings. The callee picks up or OK's receiving the call, and the caller acknowledges (ACK).

In accordance with the invention, in block 102, a caller initiates a SIP call using a SIP INVITE message. In block 104, the callee checks its well-known address base if the caller's from address or a combination of from and IP address are found, the protocol continues the unmodified SIP path. In block 106, the callee handset or proxy chooses random challenge characters (or words or symbols). In block 108, a display challenge is sent to the caller. The display challenge may include a human readable set of characters on the caller's SIP endpoint which are difficult to process with OCR.

In block 110, a play back of a human audible rendering of the characters to the caller is performed. The rendering is preferably difficult to decipher with voice recognition. In block 112, the caller will transfer a response to the challenge using the microphone or keypad of their communication device (if they are human), and the SIP protocol INVITE will be successful if a correct response is received by the callee.

To simplify the procedure for frequent or trusted callers, a quick call button may be provided on a SIP enabled handset that will disable the authentication procedure for known callers. The known caller's SIP profile such as SIP URI or fingerprint may be stored in the callee's phone. For example, an LED (or display message) on the SIP handset will indicate whether a caller is already in the set of "known callers' and whether the know caller is "cleared".

In blocks 108 and 110, the destination (callee) may generate a random string of configured length and translate the string into either an image, an audio message or both. In block 112, the destination (either proxy or handset) responds with a redirect message that in its body includes a message challenge and as its attachment includes the randomly generated image and/or audio message. If the phone or proxy is aware of challenge-response mechanism, the callee will render either the image, the audio message or both on the caller's handset. In block 114, the destination remembers the redirect and call ID for the redirected call.

In block 112, the caller responds to the string (challenge). For example, the caller may listen to a message or view an instruction rendered by the callee. The response may include entering a number or word into the keypad either by reading the string or pressing a key or keys (e.g. "#" or otherwise responding to the image). This response will cause the handset to connect/reconnect to the caller in block 116 if the response is correct. The caller handset or proxy sends an INVITE with the answer to the challenge in the body of the connect message.

If the phone or proxy on the caller side is unaware of the challenge response, the redirect will be followed and the REDIRECT message will not include the correct answer for the posed challenge. In block 118, the callee phone may be configured to drop the invite with a reject message. The callee phone or proxy may answer with a message (e.g. 1xx), but the phone may ring with a different ring tone or provide some indication of a failed challenge to alert the callee. In block 120, the call may be accepted conditionally, e.g., accepted with an OK message, but the callee handset may be configured not to ring as a result of failing the challenge.

In block 110, the callee may be prompted with an audible rendering of the random string and asked to input the string using his/her keypad. If the challenge is answered correctly, the callee handset may ring normally. If the ring times out, the handset will close the data connection and send a disconnect event to the caller as described.

Figure 2:
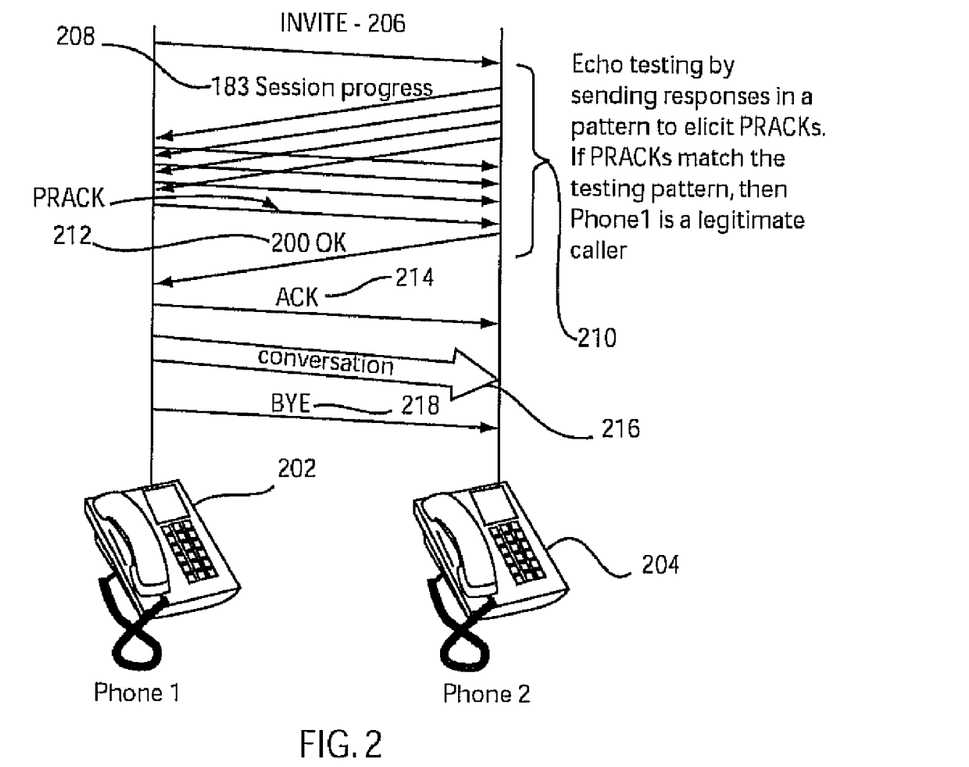
FIG. 2 is a diagram showing verification of an acceptable user and/or detecting spam in an echo test where the caller is not a spammer in accordance with one embodiment of the present invention.

Referring to FIG. 2, an example application of the present invention will now be described to illustrate the handling of a non-spam call in accordance with another embodiment of the present invention. This example provides a challenge, which includes an automatic echo test to detect a spammer, which may be sending a large number of INVITEs to many SIP URIs. A caller, represented by phone 202 sends an INVITE 206 to a callee, represented by phone 204. In response callee 204 sends a challenge, e.g., a "183 Session progress" response in a pattern to caller 202 to elicit provisional acknowledgements (PRACKs) 210. A PRACK is an acknowledgement for a provisional response, in this case for the session progress message. The pattern is crafted to not create much load at a normal caller, but could create significant load at a spammer when combined with messages from other users. For example, the pattern could be a burst of back-to-back "183 Session progress" messages in which the burst size is randomly drawn from a range (such as 10-50 packets). Another example of a crafted pattern is groups of bursts where the inter-group spacing could also be randomly drawn from a range (such as 10-500 milliseconds). For example, if phone 202 is not a spammer, it will respond with PRACKs 210. The Prack pattern is tested or compared with the pattern sent from callee 204. If it is similar to the original "183 Session progress" pattern (i.e., retains roughly similar inter-group spacing behavior), an OK signal is sent to the caller 202, which acknowledges (ACK 214). A conversation 216 or other communication (data exchange, etc.) can be conducted until the call is ended (BYE 218).

Figure 3:
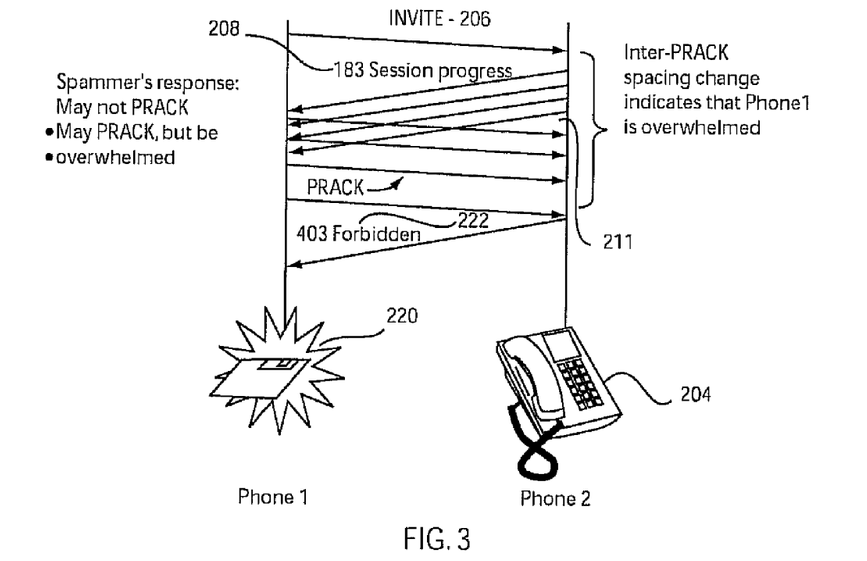
FIG. 3 is a diagram showing verification of an acceptable user and/or detecting spam in an echo test where the caller is a spammer determined by receiving an irregular response in accordance with one embodiment of the present invention.

Referring to FIG. 3, a first example or a spam call is illustratively described. If caller 220 is a spammer and does not run a full SIP stack then phone 204 can observe irregularities (e.g., no PRACKs or incorrectly formatted PRACKs) in the caller's responses to session progress 208 or other signal eliciting a response. If phone 202 is a spammer and does run a full SIP stack, then the "183 session progress" probing pattern 208 can alternately or additionally overwhelm the caller system (e.g., the caller's network link, buffers in the caller's SIP implementation related to processing of packets, the caller's memory utilization, or the caller's CPU utilization) leading to drops or delays in the PRACK responses.

Figure 4:
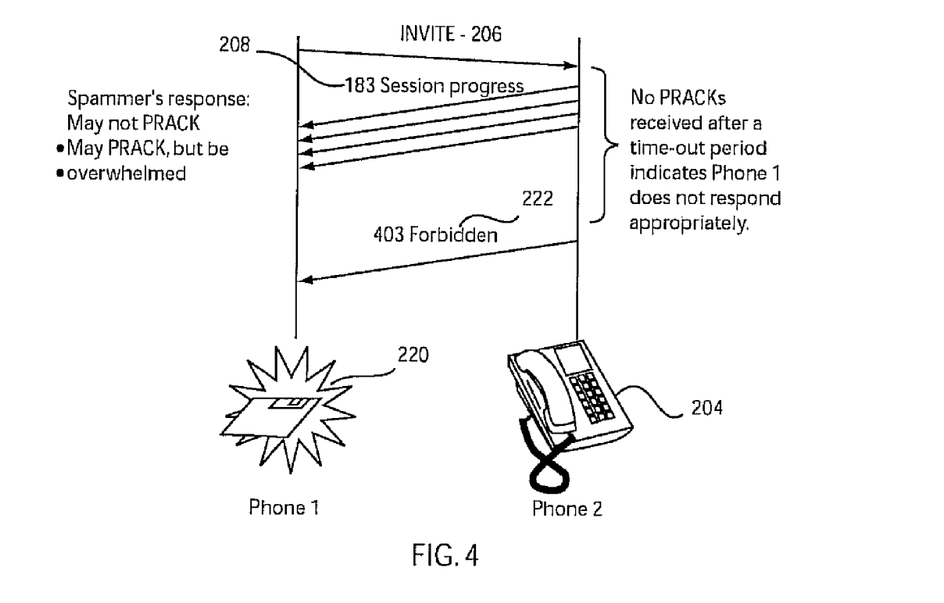
FIG. 4 is a diagram showing verification of an acceptable user and/or detecting spam in an echo test where the caller is a spammer determined by receiving an no response in accordance with one embodiment of the present invention.

In either case, since a comparison of the response signal shows irregularities, e.g., incorrect response pattern or no response (FIG. 4), the callee 204 would respond negatively to the call, e.g., terminating the call (forbidden 222), or placing the caller on a do not call list.

Problems with legitimate calls may occur in some instance unless initial steps are taken. For example, automated announcements to all employees that a company is closed due to snow may need the message senders to be authenticated and white-listed so that the calls are allowed to go through automatically before echo testing.

Figure 5:
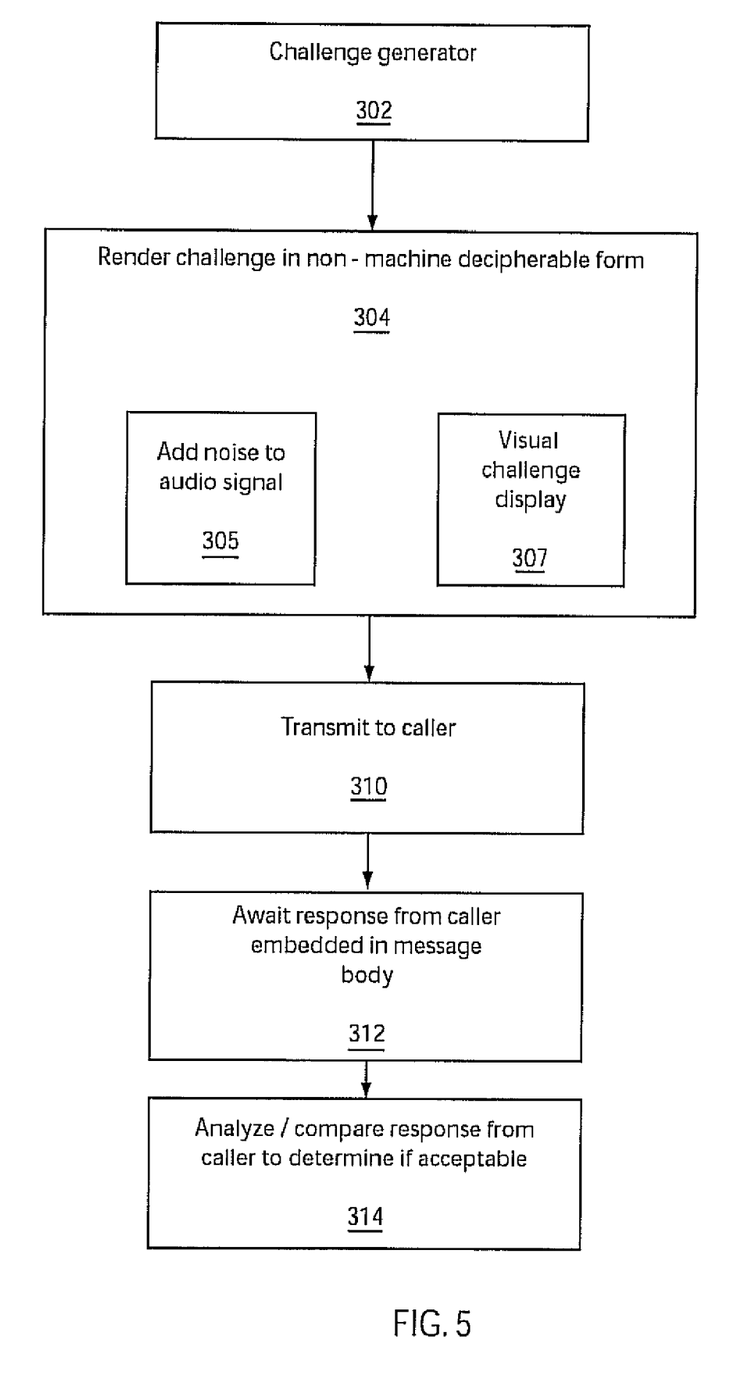
FIG. 5 is a block/flow diagram showing verification of an acceptable user and/or detecting spam for a human test in accordance with one embodiment of the present invention.
Figure 6:
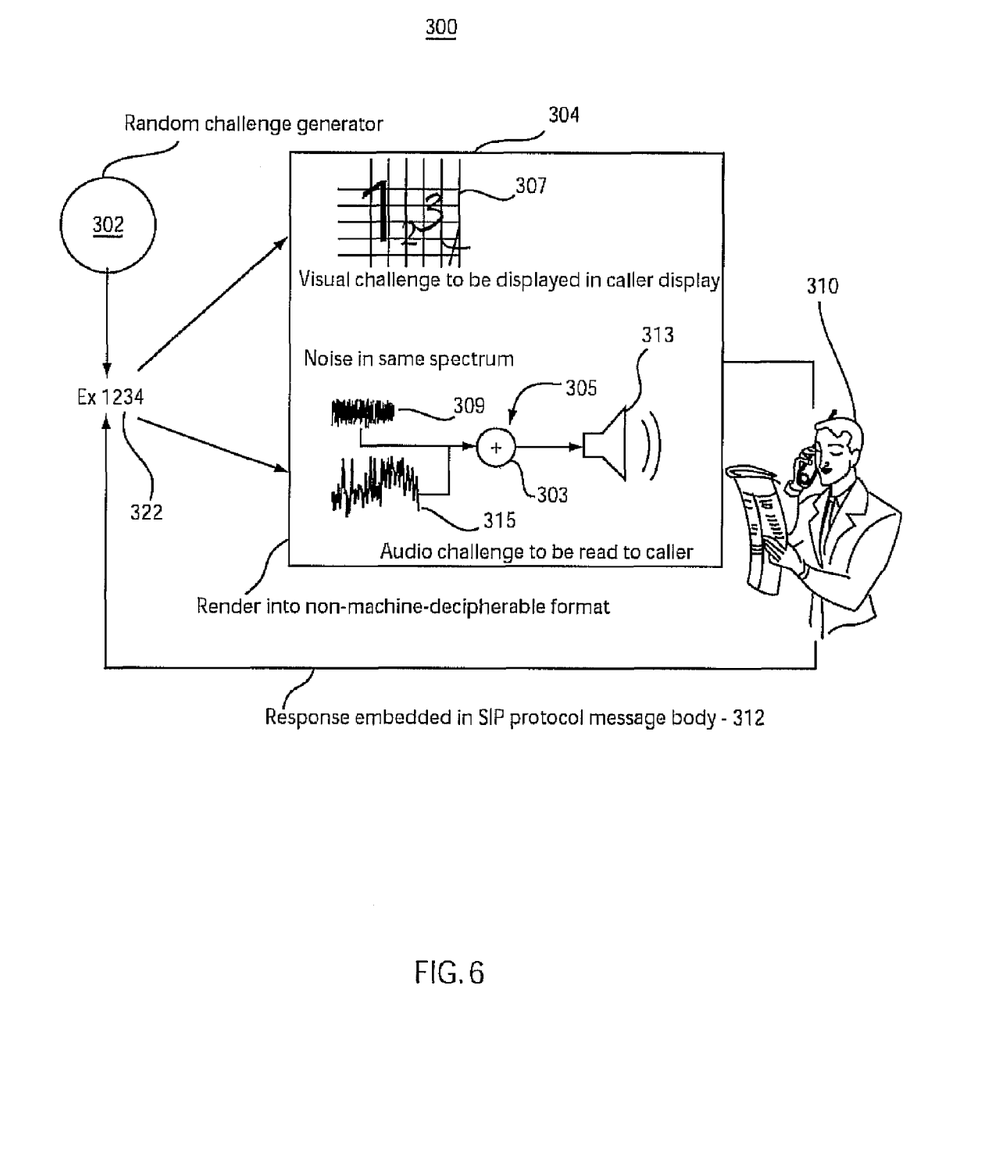
FIG. 6 is a block diagram showing a system for verification of an acceptable user and/or detecting spam in accordance with one embodiment of the present invention.

Referring to FIGS. 5 and 6, a system/method 300 is shown in accordance with an illustrative embodiment of the present invention for testing for human callers. In the illustrative embodiment shown in FIGS. 5 and 6, a challenge generator 302 generates challenges 322 to a caller. Challenges 322 may be randomly generated and may include a random number, which is compared to a plurality of challenge types and items. For example, the challenge may include a series of numbers or symbols or an audio clip, or may be selected from a plurality of symbols or audio clips in accordance with a random number generated by generator 302. The challenge generation and rendering (blocks 302 and 304) may be performed before or after a call is received.

The challenge 322 is input to a rendering device 304 which renders the challenge unreadable by machine if the challenge is a display type 307 or rendered incapable of voice/speech recognition if audio 305. For the display type 307, noise or extraneous pixels may be added to an image of the characters arranged in a way the OCR cannot properly decipher the symbols. As shown in FIG. 6, a grid with numbers of different fonts, size and arranged in an odd fashion may be employed for the display 307. As another example, the display or audio message may be "type 2" written with letters of different fonts, size and arranged in an odd fashion. An audio challenge signal 315 (FIG. 6) may be mixed with noise 309 using a mixer 303 to output an audio signal (to a speaker 313 of caller) to render the audio signal undecipherable.

The challenge is then transmitted back to a caller in block 310. The caller then responds to the challenge if they can. The challenge example of "type 2" would be easily readable of determined over noise by a human. The human would know to press the number two on his/her telephone keypad, hence providing the appropriate response to the challenge.

The callee awaits this response embedded in the message body or otherwise in block 312 and compares the response to an acceptable response, which may include the original challenge 322 or may include a different value. If the response is correct, the call is connected since the caller would be deemed a human.

Figure 7:
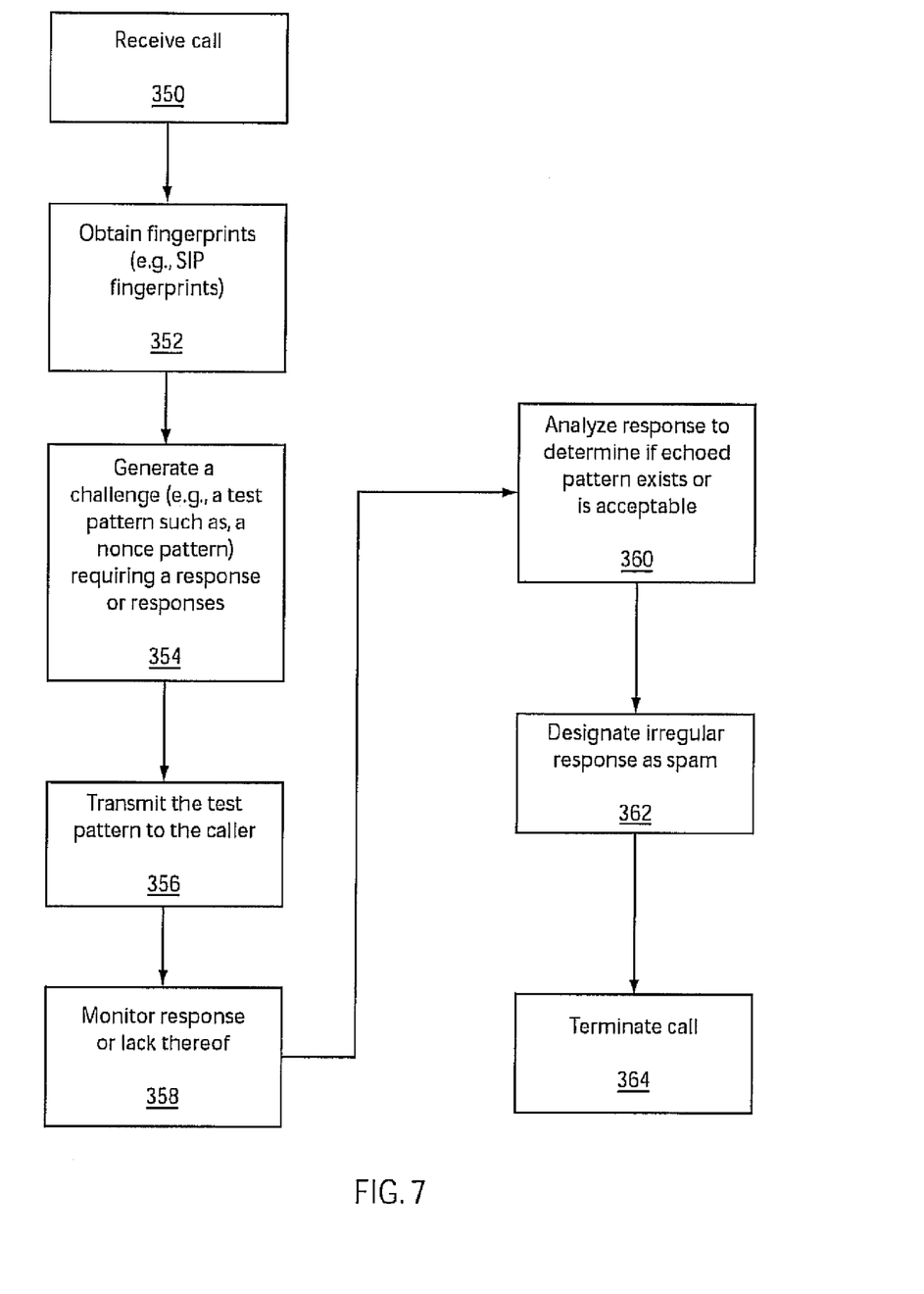
FIG. 7 is a block/flow diagram showing verification of an acceptable user and/or detecting spam for the echo test in accordance with another embodiment of the present invention.

Referring to FIG. 7, an automatic echo system/method is illustratively described in accordance with an illustrative embodiment. A call is received in block 350, and a fingerprint of the caller may be obtained in block 352. In one embodiment, SIP fingerprints are obtained. SIP fingerprints are a characterization of measured SIP protocol implementation response time or behavior of SIP devices. SIP fingerprints of known SIP devices may be maintained in a database accessible to callees. With method may be employed separately or in conjunction with other echo test methods as described and/or shown in FIG. 7. By obtaining a fingerprint of a caller, a callee can easily determine if the caller is a computer or other unwanted caller. This method may not be convenient however since all device may not be listed, etc.

In block 354, a test pattern may be generated which requires a response or responses from a caller. The test pattern may include known SIP functions, such as PRACK and OPTIONS. The pattern may be randomly generated using a challenge generator 302 (FIG. 6). The pattern is transmitted to the caller in block 356, and the response of the caller is monitored in block 358.

The response is analyzed to determine if an acceptable echo pattern exists in block 360. The analysis may include checking response packets to make sure that they have correct headers that the response pattern (e.g., inter-packet spacing, response ordering) is correlated to the original test pattern, and/or other irregularities are determined. If there is no response or the pattern is irregular the caller is designated as a machine or spammer in block 362, and the call is terminated in block 364. Otherwise the call is permitted to proceed and the phone or other device is permitted to ring.

Having described preferred embodiments of a system and method for span detection (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A voice-over-Internet protocol (VoIP) caller verification method comprising:
generating a challenge to be sent to a VoIP caller which needs a response from the VoIP caller prior to accepting a VoIP call, wherein the challenge includes a test pattern crafted to create a greater load at a spammer VoIP caller as compared to a human VoIP caller;
determining a response or lack thereof from the VoIP caller; and
analyzing the response relative to an acceptable response to determine whether the VoIP caller is acceptable to communicate with.

2. The method as recited in claim 1, wherein analyzing includes analyzing a response to the test pattern to determine if the response is acceptable.

3. The method as recited in claim 2, wherein the response to the test pattern includes provisional response acknowledgements (PRACKS).

4. The method as recited in claim 3, wherein analyzing includes analyzing the response by measuring the PRACKS to correlate the PRACKS to the test pattern to deter nine if the response is acceptable.

5. The method as recited in claim 1, wherein the challenge includes content which is undecipherable by machine for recognition.

6. The method as recited in claim 5, wherein the challenge includes an image the content of which is decipherable by a human, the method further comprising transmitting the image to the VoIP caller to evoke a response to the content.

7. The method as recited in claim 6, wherein the image includes an instruction and determining a response includes determining if the VoIP caller responds to the instruction properly.

8. The method as recited in claim 5, wherein the challenge includes audio the content of which is decipherable by a human, the method further comprising transmitting the audio to the VoIP caller to evoke a response to the content.

9. The method as recited in claim 8, wherein the audio includes an instruction and determining a response includes determining if the VoIP caller responds to the instruction properly.

10. The method as recited in claim 1, further comprising fingerprinting the caller using a session initiation protocol (SIP) profile to determine whether the VoIP caller is acceptable.

11. The method as recited in claim 1, further comprising if the VoIP caller is acceptable, accepting the VoIP call wherein accepting the VoIP call includes permitting a ring at the callee.

12. A computer program product comprising a non-transitory computer useable medium including a computer readable program, wherein the computer readable program when executed on a computer causes the computer to perform the method steps of:
generating a challenge to be sent to a VoIP caller which requires a response from the VoIP caller prior to accepting a VoIP call or permitting the VoIP call to ring at the callee, wherein the challenge includes a test pattern crafted to create a greater load at a spammer VoIP caller as compared to a human VoIP caller;
determining a response or lack thereof from the VoIP caller;
analyzing the response relative to an acceptable response to determine whether the VoIP caller is acceptable to communicate with; and
if the VoIP caller is acceptable, accepting the VoIP call or permitting a ring at the callee.

13. A non-software system for VoIP caller verification, comprising:
a challenge generator which generates challenges to be sent to a VoIP caller responsive to an initiation by the VoIP caller for communications, the challenge requiring a response, wherein the challenge includes a test pattern crafted to create a greater load at a spammer VoIP caller as compared to a human VoIP caller;
a determination module which determines if a response has been received and receives the response from the VoIP caller; and
an analyzing device which determines if the response is acceptable as compared to an acceptable response to determine whether the VoIP caller is acceptable to communicate with.

14. The system as recited in claim 13, wherein the analyzing device compares the response to the test pattern to determine if the response is acceptable.

15. The system as recited in claim 14, wherein the response to the test pattern includes a pattern of provisional response acknowledgements (PRACKS).

16. The system as recited in claim 15, wherein the PRACKS are measured to correlate the PRACKS to the test pattern to determine if the response is acceptable.

17. The system as recited in claim 12, further comprising a rendering device wherein the challenge includes content which is rendered undecipherable by machine for recognition by the rendering device.

18. The system as recited in claim 16, wherein the challenge includes an image the content of which is decipherable by a human.

19. The system as recited in claim 17, wherein the image includes an instruction and an acceptable response includes the VoIP caller responding to the instruction properly.

20. The system as recited in claim 16, wherein the challenge includes audio the content of which is decipherable by a human.

21. The system as recited in claim 20, wherein the audio includes an instruction and an acceptable response includes the VoIP caller responding to the instruction properly.

* * * * *